Dec. 2, 1952 L. W. BALDWIN 2,620,380
VELOCITY METER
Filed April 18, 1947 2 SHEETS—SHEET 1
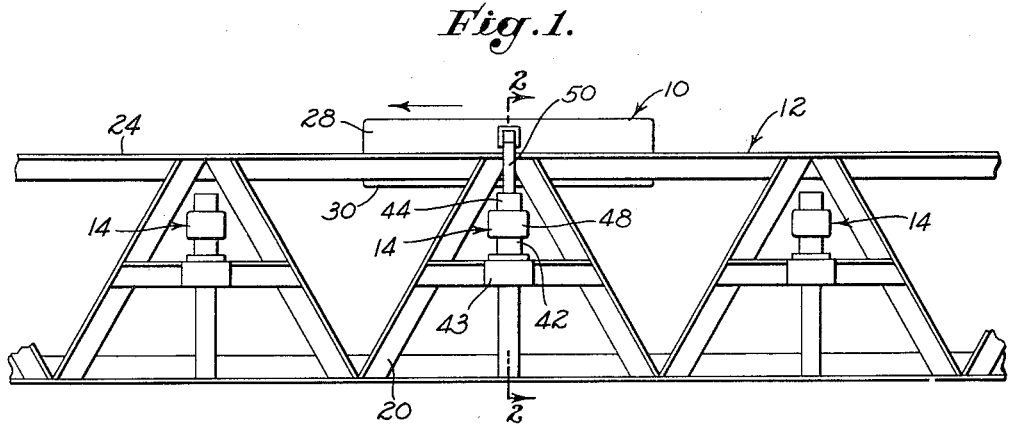
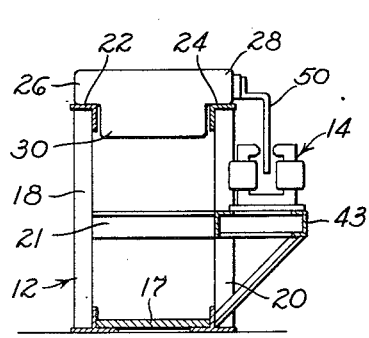
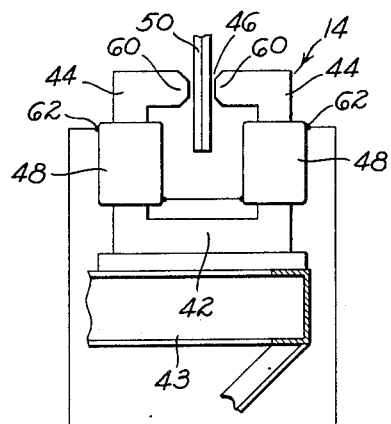
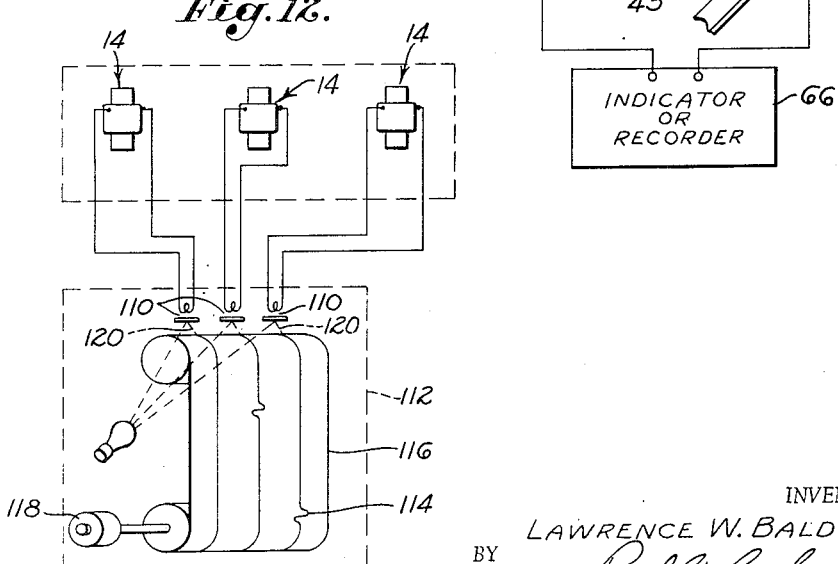
INVENTOR.
LAWRENCE W. BALDWIN
BY Reed C. Lawlor
AGENT Dec. 2, 1952   L. W. BALDWIN   2,620,380
VELOCITY METER Filed April 18, 1947   2 SHEETS—SHEET 2

INVENTOR.
LAWRENCE W. BALDWIN
BY Reed C. Lawlor
AGENT

Patented Dec. 2, 1952

2,620,380

UNITED STATES PATENT OFFICE 2,620,380

VELOCITY METER

Lawrence W. Baldwin, Oxnard, Calif.

Application April 18, 1947, Serial No. 742,287

6 Claims. (Cl. 175—183)

The invention described herein may be manufactured and used by or for the Government for governmental purposes, without the payment to me of any royalty thereon.

My invention relates to improved methods of measuring velocity and acceleration and, more particularly, to improvements in velocity meters and accelerometers.

One of the objects of my invention is to provide an improved method of measuring the relative velocity between two objects.

Another object of my invention is to provide an improved method of measuring the relative acceleration between two objects.

Another object of my invention is to provide an improved velocity meter of simple and rugged construction for measuring relative translational, or lineal, velocities in a predetermined direction.

A further object of my invention is to provide a dependable velocity meter which is free of frictional errors and which requires no fine adjustments and which requires a minimum of maintenance.

A further object of my invention is to provide apparatus for measuring the relative velocity and acceleration of objects in a predetermined direction free of any errors that might arise because of movements in a transverse direction.

Another further object of my invention is to provide a velocity meter which employs a magnet having an air-gap and which indicates directly the maximum rate of change of flux therein due to the single passage of an armature therethrough.

A still further object of my invention is to provide a velocity meter of the induction type which is adapted to indicate velocity accurately throughout a limited velocity range.

And a still further object of my invention is to provide an improved apparatus employing a plurality of such velocity meters for measuring acceleration.

My invention possesses numerous other objects and features of advantage, some of which, together with the foregoing, will be set forth in the following description of specific apparatus embodying and utilizing the novel method of my invention. It is to be understood that my method is applicable to other apparatus and that I do not limit myself to the apparatus of the present specification as I may adopt various other apparatus embodiments utilizing my method within the scope of the appended claims.

In the drawings wherein like reference characters indicate like elements throughout the several views:

Fig. 1 is a side elevational view of apparatus embodying my invention;

Fig. 2 is a sectional view of the apparatus illustrated in Fig. 1 taken on the line 2—2;

Fig. 3 is a schematic diagram of the velocity meter illustrating the magnet structure in greater detail;

Figure 11:
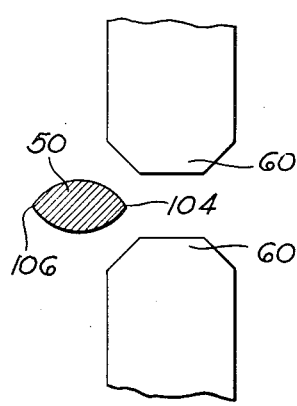

Figs. 4 through 10 inclusive are schematic diagrams of circuits for indicating velocity;

Fig. 11 is a horizontal cross-sectional view of a velocity pickup employing an armature having tapered edges;

Fig. 12 is a schematic diagram of an alternative embodiment of my invention.

According to my invention the relative velocity between two objects is determined by passing a soft-iron armature carried on one of the objects through the gap between the pole-tips of a magnet carried on the other object and measuring the rate of change of flux in the magnet. In the preferred embodiment of the invention, the gap is arranged along a line perpendicular to the relative line of travel of the two objects and the pole tips of the magnet are shaped to define a magnetic field which is of somewhat uniform intensity over a portion of the gap along a line parallel to the direction of the magnetic flux. In this preferred embodiment of the invention, the soft-iron armature has a length perpendicular both to the line of travel and to the length of the gap which is substantially greater than the width of the pole-tips of the magnet. Furthermore, in the preferred embodiment of the invention, the armature is so positioned that part of it passes above the air-gap and part of it below the air-gap. With this arrangement, the changes of flux which occur in the magnet when the armature passes therethrough, and hence the velocity indicated, are relatively independent of small errors in the relative positions of the armature and the air-gap. Furthermore, the velocity indicated is also relatively independent of any components of relative velocity in directions perpendicular to the line of travel in question, since the changes of flux which occur in the magnet are substantially determined solely by the relative velocity of travel of the objects along that line. In the preferred embodiment of the invention the relative velocity of the two objects is determined by measuring the maximum rate of change of flux in the magnet resulting from the passage of the armature through its air-gap.

Also according to my invention the relative acceleration of the two objects is determined by measuring the relative velocities thereof in the above-mentioned manner at a plurality of aligned points located at measured distances apart, and calculating the acceleration from the distances between the points and the velocities thereat.

Referring first to Figs. 1, 2, and 3, there is illustrated apparatus embodying the features of my invention and comprising a first object, such as a sled or carriage, 10 which moves relatively to a second object, or stationary frame, 12 along a predetermined line of travel. This apparatus also comprises a plurality of magnets, or pickups, 14 of corresponding velocity meters for measuring the relative velocity and acceleration of the two objects along that line of travel. In the preferred embodiment of the invention, a peak voltage meter associated with each pickup 14 is used to indicate the instantaneous velocity of the carriage 10 at the position of each pickup as more fully described hereinbelow.

For convenience the apparatus is described hereinafter as though the frame 12, and hence the line of travel, were horizontal though it is to be understood that the frame may be inclined to the horizontal and measurements made along the corresponding inclined line of travel.

The frame 12 comprises a horizontal elongated base wall member 17 and two upstanding side wall members 18 and 20 rigidly attached thereto on opposite sides thereof and rigidly held together by cross beams 21 at their mid-sections. The two side wall members 18 and 20 carry rails 22 and 24 rigidly attached to their upper ends. The carriage 10 is provided with side extensions 26 and 28 which are arranged to slide upon the rails 22 and 24 and is also provided with a depending portion 30 which extends downward a short distance into the space between the side wall members 18 and 20 above the cross beams 21. The guide rails 22 and 24 are straight and define a line along the length of the frame 12 along which the carriage 10 travels. The carriage 10 itself may be of the self-motivating type or it may merely be a launching sled. In either event, the problems with which my invention is particularly concerned are the determination of the translational or lineal velocity of the carriage relative to the frame at some predetermined point along the line of travel and the acceleration between a series of points on the line of travel.

Each of the pickup units 14 comprises a permanent magnet 42 mounted externally of the frame 12 on an extension arm 43 which is rigidly attached to one side wall member 20. The magnet 42, which is preferably of U-shape, is mounted in a vertical plane with its legs 44 standing vertically and its air-gap 46 arranged at the uppermost end thereof. The plane of the magnet 42 is perpendicular to the line of travel so that the length of the air-gap 46 and hence the direction of the magnetic flux passing therethrough lies in a horizontal line perpendicular to the line of travel.

Besides one of the pickups 14, each of the velocity meters also comprises a common armature 50 in the form of a vertically extending bar, preferably composed of soft iron, which is rigidly attached to one outer side of the carriage 10 and is mounted thereon in such a position that it passes through the gap 46 of each of the magnets 42 during the movement of the carriage 10 on the frame 12. Two serially-connected sections of a pickup coil 48 are arranged on opposite legs 44 of each magnet 42. When the armature 50 moves through each gap 46 a voltage proportional to the rate of change of flux in the corresponding magnet is induced in the coil 48.

The armature 50 is of such a length vertically that when it passes through each air-gap 46 its lower portion extends below and its upper portion extends above the air-gap, so that the change of flux in the magnet is substantially independent of the vertical position of the carriage 10 on the frame 12 and is also substantially independent of any slight vertical component of velocity of the carriage. Furthermore, in order to render the change of flux in each magnet 42 independent of any small horizontal displacement of the armature in a direction along the lengths of the air-gaps 46, the pole-tips 60 of each magnet are so tapered or otherwise shaped according to principles well-known in the art, as to establish a somewhat uniform magnetic flux in the air-gap. With this arrangement the changes of flux which occur in each magnet 42 when the armature 50 passes through the corresponding air-gap 46 does not depend upon exact alignment of the air-gaps with the line of travel of the armature and is substantially independent of any transverse component of velocity of the carriage.

The armature 50 is preferably as thick as possible consistent with sufficient clearance to avoid striking the pole-tips 60. Also the armature preferably has a width along the line of travel about equal to or greater than the width of the pole-tips 60 in that direction as indicated more clearly in Fig. 11. With this arrangement a large change of flux in the magnet is produced when the armature 50 enters and leaves the air-gap 46.

In operation when the carriage 10 travels along the length of the frame 12, the armature passes through the portion of each gap 46 in which the magnetic flux is substantially uniform. As the armature 50 enters each air-gap 46, the reluctance of the magnetic circuit of the permanent magnet 42 associated therewith is reduced, thereby increasing the magnetic flux through the corresponding pickup coil 48 and inducing a voltage of a predetermined polarity between the terminals 62 thereof. Likewise when the armature 50 emerges from each air-gap 46, the reluctance of the magnetic circuit of the permanent magnet 42 associated therewith is increased, thereby decreasing the magnetic flux passing through the corresponding pickup coil 48 and inducing a voltage of the opposite polarity between the terminals 62.

As previously mentioned, the rate of change of flux in each magnet 42 and hence the voltage induced in the measuring circuit, depends only upon the horizontal component of velocity of the carriage 10 along the length of the frame 12. Actually, the instantaneous value of the voltage induced in the pickup coil 48 varies as a function of time, both when the armature enters and when the armature leaves the air-gap 46 associated therewith. The velocity of the carriage 10 at the position of one of the gaps 46 is determined by measuring the value of the voltage induced in the corresponding pickup coil 48 at some predetermined portion of the travel of the armature through the air-gap at that point. Preferably, for simplicity, the peak or maximum value of the voltage induced in the pickup coil 48 in both directions or in one direction or the other is measured. By suitable calibration the voltage measured indicates the relative velocity. In any event, a voltage indicator or recorder 66 used for this purpose is connected to the terminals 62 of the coil 48.

The voltage induced in each pickup coil 48 may be measured in a number of ways. If desired, the wave form of the voltage induced in each pickup coil 48 may be displayed on a screen of a cathode ray oscilloscope or recorded with an oscillograph serving as the indicator 66. In either case the height of the wave at some predetermined point thereof is measured. However, as previously mentioned, in the preferred embodiment of my invention an indicator 66 in the form of a peak voltage measuring circuit is connected across the pickup coil 48. The peak voltage measuring circuit 66 which I utilize is designed to measure the peak voltage appearing across the pickup coil 48 even though only a single voltage pulse occurs therein.

Figure 4:
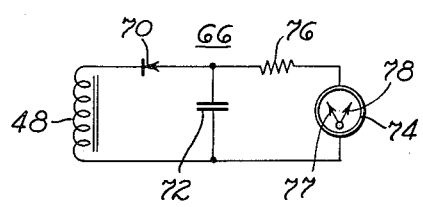

A peak voltage measuring circuit 66 of the type preferably employed in my invention is illustrated in Fig. 4. This measuring circuit comprises a copper-oxide or selenium-oxide rectifier 70 and a condenser 72 connected in series across the pickup coil 48 and also comprises a current indicating meter 74 and a large resistor 76 connected in series across the condenser 72. In effect, this circuit lengthens the duration of a voltage pulse induced in the coil 48 thereby permitting a visual observation of the peak voltage on an ordinary current meter 74.

When the armature 50 passes through each air-gap 46, a voltage pulse having both a positive portion and a negative portion is induced across the corresponding pickup coil 48. The rectifier 70 has a minimum resistance to voltage of one sign and a maximum resistance to voltage of the opposite sign. As a result, when the voltage is of one sign the resistance of the rectifier 70 is low and considerable current flows therethrough in one direction charging the condenser 72 to a voltage corresponding to the instantaneous value of voltage appearing across the coil 48. When the voltage is of the opposite sign, the resistance of the rectifier 70 is high and very little current flows therethrough. Preferably the time constant of the circuit, including the coil 48, the rectifier 70, and the condenser 72, during the time that the resistance of the rectifier 70 is low, is established at a value comparable with and preferably less than the time interval during which the voltage pulse is of substantially its maximum value. Under these conditions, the voltage produced across the condenser 72 is an excellent measure of the peak voltage induced across the pickup coil 48.

Preferably the resistance of the resistor 76 in series with the meter has a value intermediate the maximum and minimum values of resistance of the rectifier 70 so that the condenser charges through the rectifier 70 and discharges through the meter 74. This intermediate value is preferably at least ten times the minimum resistance of the rectifier 70 and between about one-fourth to about one-half of the maximum resistance of rectifier 70.

When the value of the voltage being induced in the coil 48 commences to decrease, there is a tendency for the condenser 72 to discharge in the opposite direction through the rectifier 70. However, because of the large resistance of the rectifier 70 to the passage of current therethrough in this direction, the tendency of the condenser 72 to discharge therethrough is actually very low. As a result, most of the current discharges through the indicating meter 74. If desired, the meter may be of a type having two hands 77 and 78, the first of which 77 is deflected in proportion to the current passing therethrough and the other of which 78 is forced into a stationary position by the first. After a reading of the deflection of the second hand 78 is made, the second hand is moved back to a zero or neutral position preparatory to being deflected again by the first hand. The deflection appearing on the second hand 78 is a function of the peak voltage induced in the coil 48 and this deflection gives a direct indication of the velocity of the carriage 10 relative to the frame 12.

Figure 5:
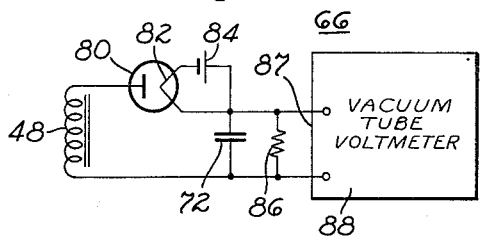

In Fig. 5 there is illustrated another circuit 66 for indicating the peak voltage induced in the pickup coil 48. In this case the current is rectified by means of a two-element vacuum tube, or diode, 80. The cathode 82 of the diode 80 is heated by means of a battery 84. In operation, this diode has a large resistance in one direction and a small resistance in the opposite direction so that it acts to charge the condenser 72 connected in series therewith to a voltage corresponding to the peak voltage induced in the pickup coil 48. In this instance, the condenser 72 is discharged through a resistance 86 connected across the input 87 of a vacuum tube voltmeter 88.

Figure 6:
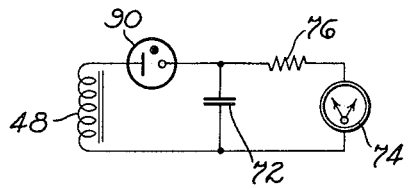

In case a cold cathode rectifier 90 is used instead of a thermionically-emissive cathode rectifier 80 to avoid the use of a battery, the current indicating meter 74 and the resistor 76 are preferably connected across the condenser 72 as illustrated in Fig. 6. In this case satisfactory operation of the circuit is attainable as long as the peak voltage induced in the pickup coil exceeds the ignition voltage of the cold cathode rectifier 90, that is as long as the velocity to be measured exceeds a corresponding minimum value.

Figure 7:
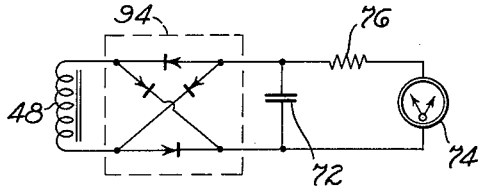

In Fig. 7 there is illustrated a modification of Fig. 4 wherein a full-wave bridge rectifier 94 is used instead of a half-wave rectifier 70. In this case, the circuit operates the same as that illustrated in Fig. 4 except for the fact that if the individual circuit elements having the same constants, the condenser 72 is charged to a voltage more nearly approaching the peak voltage and thus greater accuracy is attained.

Figure 8:
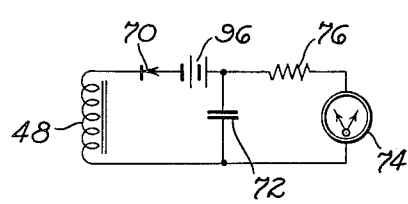
Figure 9:
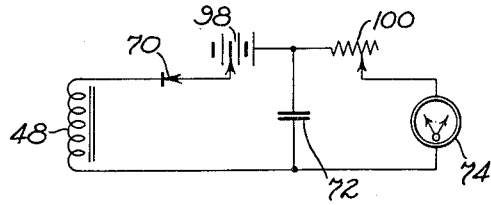

In Fig. 8 there is illustrated a circuit which permits the measurement of velocities in a readily selected predetermined range with great accuracy. This circuit is similar to that previously illustrated in Fig. 4 except that a battery 96 is connected in series with the rectifier 70. The polarity of the battery is arranged to bias the rectifier 70 so as to oppose the charging of the condenser 72 until the voltage induced in the pickup coil 48 exceeds the voltage of the battery. With this arrangement, the resistance offered by the rectifier 70 to the flow of current from the battery 96 is normally high so that the battery is not required to supply any appreciable amount of power and can therefore be of small capacity and yet have a long, useful life. It is to be noted that the minimum value of velocity that can be indicated with this circuit is determined by the voltage of the battery 96 and that the maximum velocity that can be indicated depends upon the value of the current required to discharge through the resistor to produce the full-scale current of the meter 74. Thus, if desired, by suitable choice of circuit constants, the circuit can be designed to measure velocity in a predetermined range and the advantages of full-scale operation of the current meter throughout that range obtained. A flexible arrangement of this type is obtained by replacing the fixed battery 96 and the fixed resistor 76 of Fig. 8 with a tapped battery 98 and a rheostat 100 respectively, as illustrated in Fig. 9.

Figure 10:
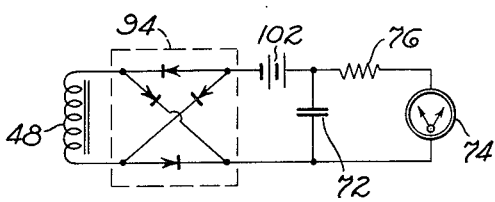

In Fig. 10 there is illustrated an alternative embodiment of my invention of the type previously illustrated in Fig. 7 employing a full-wave rectifier 94 but to which a battery 102 has been added to establish a minimum velocity threshold for the indicating circuit in the same manner as previously described in connection with Fig. 8.

If desired, the cross-section of the armature 50 in a horizontal plane may be so designed that a relatively flat-topped wave-form of the voltage induced in the pickup coil 48 may be achieved. This effect may be accomplished, for example, by employing an armature 50 having tapered leading and trailing edges 104 and 106 as indicated in Fig. 11. The advantage of producing a relatively flat-topped wave resides in the fact that the voltage induced in the coils is constant for a relatively extended period while the voltage is at its maximum value, thus facilitating the charging of the condenser to a voltage more nearly equal to the maximum induced voltage.

It is clear that a series of pickup units 14 may be mounted in a line along the side of the frame 12 as illustrated in Fig. 1 in order to establish a plurality of aligned airgaps 46 through which the armature 50 passes in sequence. By measuring the velocity of the carriage at each of these points in the manner described hereinabove, the acceleration of the carriage between successive points may be determined. The calculation of the acceleration does not require an exact measurement of the time intervals between the passage of the armature through the successive gaps but may be made from these velocities and the distances between the air-gaps 46. Thus, for example, if the velocity is measured at two points spaced apart a distance S and found to be $V_1$ and $V_2$ respectively, then if the acceleration A is substantially uniform between the points it is given approximately by the formula $$A = \frac{V_2^2 - V_1^2}{2S}$$

By determining such values for a succession of at least three points, the uniformity of the acceleration may be tested.

In the alternative embodiment of the invention illustrated in Fig. 12, each of a plurality of pickups 14 arranged along the frame 12 is connected to a corresponding galvanometer 110, or like recording element, of a multiple element oscillograph 112. With this oscillograph 112, a separate record is made of the voltage wave 114 produced as the carriage passes each of the corresponding pickups 14. These voltage waves are recorded in conventional manner on a record paper 116 which is driven at a constant speed by a motor 118 past light beams 120 projected thereon from the galvanometers 110. By determining the times of passage of the carriage past the pickups 14 from the voltage waves recorded, and knowing the distances between the pickups, the average velocity of the carriage 10 relative to the frame 12 between successive pickups 14 may be determined. If the times are also measured by means of a multiple element oscillograph as well as the instantaneous velocities, the additional data may be used for many purposes such as to compare the instantaneous velocity of the carriage 10 at each pickup 14 with the average velocity between successive pickups. It will be noted, however, that a very adequate set of data for measuring velocity and acceleration is obtainable with the relatively low cost peak voltage measuring circuits hereinabove described.

While particular arangements and specific details of various embodiments of my invention have been set forth in this specification for the purpose of completely disclosing the method of my invention and the principle involved in its operation, it is to be understood that my invention is not limited thereto but only by the scope of the appended claims.

I claim:

1. In a method of determining the acceleration of a first object relative to a second object by means of an armature mounted on one of said objects and a plurality of permanent magnets having gaps therein arranged along a line at points mutually spaced apart known distances on the other of said objects, each of the gaps being formed by poles of opposite polarity, the steps which comprise successively carrying the armature once through the gaps transversely to the flux traversing said gap and from one side of said gap to the other whereby a single pulse of magnetic flux occurs in each of the magnets at a rate dependent on the relative positions of said objects along the line of travel as well as upon their instantaneous relative velocity, and measuring the maximum rates of the resultant change of flux occurring in each of the respective magnets during such single carriage of the armature through the respective gaps, whereby the acceleration can be calculated from the different rates of change of flux and the distances between the gaps.

2. In apparatus for measuring the relative velocity of two objects arranged to be relatively movable along a substantially straight line of travel, a magnet carried by one of said objects and having pole-tips of opposite polarity defining an air-gap normal to said line of travel, said pole-tips being shaped to establish a substantially uniform flux in a portion of said gap along the length thereof, a soft-iron armature carried by the other object, said soft-iron armature having a dimension perpendicular to said line of travel and to the length of said gap which is substantially greater than the width of said gap and being so positioned on said other object as to pass through said portion of said air-gap from one side thereof to the other during the relative motion of said objects along said line of travel, the cross-sectional configuration of said armature transverse to said dimension being substantially uniform along said dimension, whereby flux changes in said magnet are substantially determined solely by the relative velocity of travel of said objects along said line of travel, and means for indicating the maximum rate of change of flux induced in said magnet during a single pass of said armature through said gap.

3. In apparatus for measuring the relative acceleration of two objects arranged to be relatively movable along a substantially straight line of travel, a plurality of magnets carried by one of said objects, each magnet having pole-tips of opposite polarity defining an air-gap normal to said line of travel, said gaps being arranged at predetermined intervals along said line, said pole-tips being shaped to establish a substantially uniform flux in a portion of each gap along the length thereof, a soft-iron armature carried by the other object, said soft-iron armature having a dimension perpendicular to said line of travel and to the lengths of said gaps which is substantially greater than the width of said gaps, said soft-iron armature being so positioned on said other object as to pass through said portions of said air-gaps during the relative motion of said objects along said line of travel, the cross-sectional configuration of said armature transverse to said dimensions being substantially uniform along said dimensions, whereby flux changes in said magnets are substantially determined solely by the relative velocity of travel of said objects along said line of travel, and means for indicating the maximum rates of change of flux induced in said magnets during single passes of said armature through the respective gaps, whereby the average acceleration of objects between successive gaps may be ascertained from said maximum rates of change and the distances between said successive gaps.

4. In apparatus for measuring the velocity of an object, means for guiding said object along a predetermined path, and a plurality of permanent magnets defining a corresponding plurality of gaps aligned on a line parallel to said path, each of said gaps being arranged transversely of said line, and an armature adapted to be carried by said object along said line as said object moves along said path whereby said armature passes each of said gaps in succession.

5. In apparatus for measuring the velocity of an object, means for guiding said object along a predetermined path, a plurality of permanent magnets defining a corresponding plurality of gaps aligned on a line parallel to said path, each of said gaps being arranged transversely of said line whereby an armature carried by said object can pass through each of said gaps in succession, and means responsive to the changes in flux in each of said gaps as said armature passes therethrough for measuring the velocity of said object.

6. In apparatus for measuring the acceleration of an object, means for guiding said object along a predetermined path, a plurality of permanent magnets defining a corresponding plurality of gaps aligned on a line parallel to said path and at predetermined distances apart, each of said gaps being arranged transversely of said line whereby an armature carried by said object can pass through each of said gaps successively, and means for measuring the maximum rate of change of flux occurring in each of said gaps as said armature passes therethrough whereby the acceleration of the object on said path may be measured.

LAWRENCE W. BALDWIN.

REFERENCES CITED

The following references are of record in the file of this patent:

UNITED STATES PATENTS

| Number | Name | Date |
|---|---|---|
| 1,465,352 | Dobson | Aug. 21, 1923 |
| 1,477,017 | Sprague | Dec. 11, 1923 |
| 1,804,168 | Keller | May 5, 1931 |
| 1,846,678 | Ferrel | Feb. 23, 1932 |
| 1,849,831 | Hewlett | Mar. 15, 1932 |
| 2,300,198 | Brown | Oct. 27, 1942 |
| 2,332,773 | Barnette et al. | Oct. 26, 1943 |
| 2,355,128 | Whitlock | Aug. 8, 1944 |
| 2,409,857 | Hines | Oct. 22, 1946 |
| 2,425,987 | Boykin | Aug. 19, 1947 |